United States Patent [19]

Riley

[11] Patent Number: 4,535,969
[45] Date of Patent: Aug. 20, 1985

[54] VALVE STRUCTURES

[75] Inventor: Larry T. Riley, Millville, N.J.

[73] Assignee: Ace Glass Incorporated, Millville, N.J.

[21] Appl. No.: 349,756

[22] Filed: Feb. 18, 1982

[51] Int. Cl.³ .............................................. F16K 31/44
[52] U.S. Cl. ..................................... 251/215; 251/309
[58] Field of Search .............. 251/304, 309, 312, 314, 251/162, 88, 218, 215

[56] References Cited

U.S. PATENT DOCUMENTS

| | | | |
|---|---|---|---|
| 862,741 | 8/1907 | Kieren | 251/310 |
| 1,349,823 | 8/1920 | Eimer et al. | 137/248 |
| 2,516,825 | 7/1950 | Hejduk et al. | 251/218 |
| 2,712,454 | 7/1955 | Love | 284/4 |
| 2,887,293 | 5/1959 | Gasche | 251/88 |
| 3,111,136 | 11/1963 | Persidsky | 137/315 |
| 3,126,193 | 3/1964 | Atherton | 251/88 |
| 3,241,570 | 3/1966 | Mueller | 137/625 |
| 3,325,143 | 6/1967 | Phillips | 251/311 |
| 3,395,925 | 8/1968 | Dreiding | 277/168 |
| 3,490,736 | 1/1970 | Snyder | 251/215 |
| 3,612,102 | 10/1971 | Hulsey | 137/625 |
| 3,615,072 | 8/1971 | Kaucher | 251/368 |
| 3,682,200 | 8/1972 | Deve | 137/625 |
| 3,814,378 | 6/1974 | Wurzburger | 251/283 |
| 3,815,871 | 6/1974 | Carlson | 251/310 |
| 3,943,962 | 3/1976 | Nagy | 137/270 |
| 3,985,155 | 10/1976 | Nightingale | 137/625 |
| 4,037,820 | 7/1977 | Lowe | 251/310 |

FOREIGN PATENT DOCUMENTS

| | | | |
|---|---|---|---|
| 588396 | 5/1947 | United Kingdom | 251/309 |
| 1014246 | 12/1965 | United Kingdom | 251/215 |

Primary Examiner—Martin P. Schwadron
Assistant Examiner—Sheri Novack
Attorney, Agent, or Firm—Shapiro and Shapiro

[57] ABSTRACT

This disclosure describes a quick opening valve structure particularly suitable for use in laboratory applications as a stopcock and the like. The structure includes a valve housing, which may be made of glass, and has a barrel section defining a valve chamber and coaxial inlet and outlet branches leading to and from the chamber through respective inlet and outlet ports. The axis of the valve chamber is disposed at an acute angle to the common axis of the ports. A valve plug, which may be made of a polymeric material, threads into and out of the valve chamber. The plug has an inclined end face disposed at an angle corresponding to the angle of the valve chamber relative to the axis of the ports. The plug has a closed position isolating one port from the other. Rotation of the plug 180° from the closed position in a direction threading the plug outwardly of the chamber, provides substantially full opening of the valve, with the end face of the plug disposed in parallel to the common axis of the ports. Further 360° outward threading of the plug serves completely to withdraw the end section of the plug from the path of fluid flow through the valve, while maintaining a seal in the barrel section.

14 Claims, 3 Drawing Figures

VALVE STRUCTURES

FIELD OF THE INVENTION

This invention relates to valve structures, for fluid flow control, of the type comprising a valve housing defining a valve chamber having inlet and outlet ports, and a valve plug mounted for rotation within the valve chamber between valve-closing and valve-opening positions. In a valve-closing position, the plug serves to isolate one port from the other, and in a valve-opening position, the plug provides communication between the respective ports through the valve chamber.

The invention is more particularly, though not exclusively, directed toward valve structures suitable for use as laboratory stopcocks in which the housing may be made of glass so as to be suitable for sealing to a glass manifold or other glass piece.

OBJECTS OF THE INVENTION

One object of the invention is to provide a quick-opening and closing valve structure of the type described, in which only 180° of plug rotation is required to provide substantially full opening and closing of the valve.

A further object of the invention is to provide a valve structure in accordance with the preceding paragraph, which, in open position, when the plug is rotated about 180° from the closed position, provides substantially unobstructed passage therethrough, so that tubes, rods and the like may readily be passed through the valve chamber.

Another object is to provide a valve structure which minimizes turbulence in fluid flowing therethrough when the valve is open.

Still another object of the invention is to provide a valve structure of relatively simple and economical construction.

Yet another object is to provide a valve structure which is versatile in use, particularly in laboratory applications.

SUMMARY OF THE INVENTION

In accordance with one aspect of the invention there is provided a valve structure comprising a valve housing defining a valve chamber having a cylindrical wall, means defining a first port in said wall, means defining a second port in said wall opposite said first port, a valve plug mounted in said chamber for rotation about the cylinder axis of the chamber, said plug having a substantially flat inclined end face, said plug in a closed position of the structure providing a seal between the ports isolating one port from the other, and said end face having a disposition and angle of inclination such that 180° rotation of the plug from said closed position substantially uncovers the ports to permit fluid flow through the structure.

The ports may preferably be disposed coaxially and be associated with substantially coaxial inlet and outlet lines, with the cylinder axis of the valve chamber being at an acute angle, e.g. 45°, to the common axis of the ports, and with the plug end face being at a corresponding angle to the chamber axis, so that in closed position, the end face may be disposed substantially orthogonally with respect to the common axis of the ports, and when rotated 180° to open the valve, the end face may be disposed in substantial parallelism with said common axis. This construction is useful in avoiding turbulence in fluid flowing through the valve.

In accordance with another aspect of the invention, with a view to enhancing the quick-opening and closing characteristics of the structure, rotational movement of the plug in the valve chamber may be accompanied by axial movement of the plug in a direction withdrawing the plug from between the ports when the plug is rotated to open the valve, and in the opposite direction when the plug is rotated to close the valve. To provide the required axial movement, the plug may have threaded engagement in the housing, and conveniently the threads may be mutually designed to provide a stop for terminating threading of the plug into the housing at a point wherein the plug is in the closed position aforesaid.

In a preferred form of the invention, rotation of the plug through 540° from the closed position, accompanied by its axial movement, is effective entirely to remove the plug from within the path of fluid flowing through the valve.

Additional features and advantages of the invention will be apparent from the ensuring description and claims read in conjunction with the accompanying drawings.

DESCRIPTION OF PREFERRED EMBODIMENT

Figure 1:
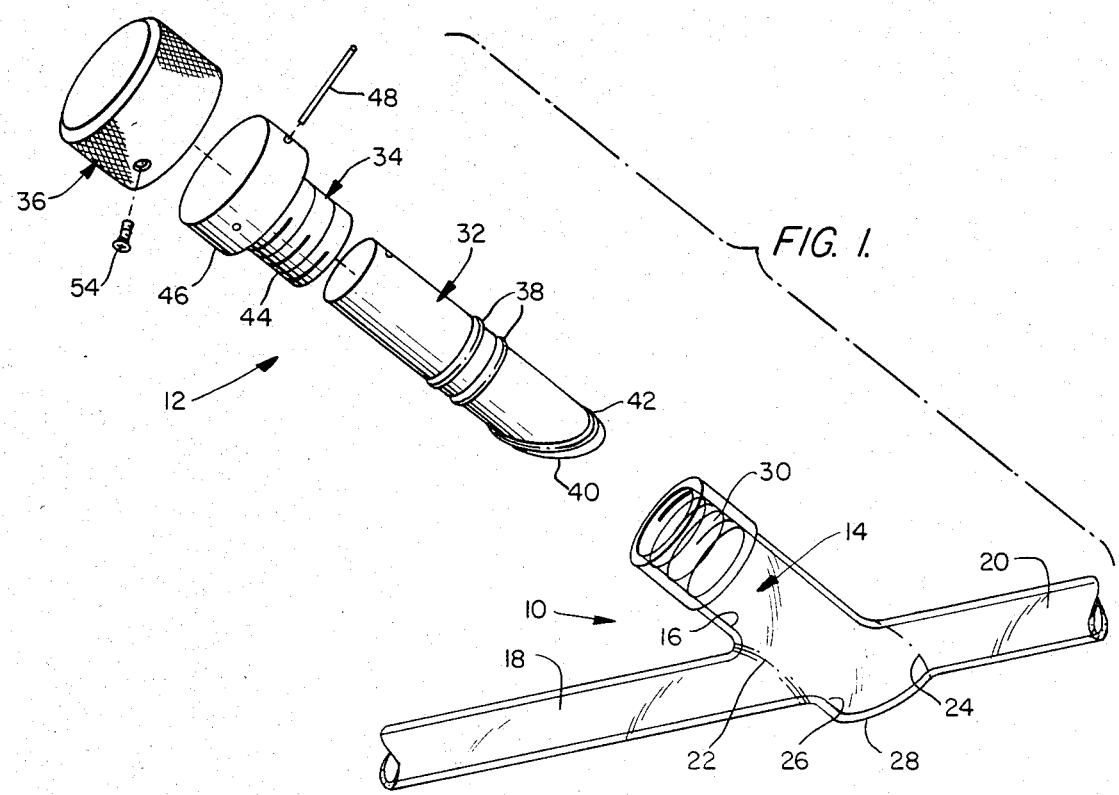
FIG. 1 is an exploded perspective view of a valve structure in accordance with the invention.

The illustrated valve structure includes a valve housing 10 and a moving valve member 12 (FIG. 1).

The valve housing, particularly when the structure is to be used as a laboratory stopcock, may be made of glass, and may include a central barrel section 14 defining an internal valve chamber having a cylindrical wall 16 and opposed arms in the form of tubes 18 and 20. Arm 18 terminates in a port 22 in the cylindrical wall of the valve chamber and arm 20 terminates in a similar port 24 opposite port 22. Preferably, the ports and arms are coaxial and an acute angle, e.g., 45°, is formed between the cylinder axis of the barrel section and the common axis of the ports and arms. The barrel section is extended at least on that side containing port 22 (the port associated with the arm subtending the acute angle) to provide a sealing section 26. A base 28 of the barrel section is illustrated as being closed off, but it is within the scope of the invention for a third port and tubular arm to lead from the base of the barrel section. The open top of the barrel section as an internally threaded portion 30.

It will be understood that in the illustrated structure, either one of the illustrated arms and associated ports may provide an inlet to the barrel section and the other port and arm may provide a corresponding outlet from the barrel section.

Valve member 12 may include a substantially cylindrical valve plug 32, which, for laboratory purposes, may be formed of a machinable inert polymeric material such as PTFE, a screw threaded insert 34, and an operating knob 36.

Plug 32 has a distal end face 40 which is substantially flat and inclined to the longitudinal axis of the plug at an angle, e.g., 45°, corresponding to the angle between the barrel section and arm 18 of the valve housing. Intermediate its length, the plug is provided with peripheral seals 38, which may for example comprise O-rings of Neoprene or other resilient sealing material disposed, for example, in suitable grooves formed in the outer surface of the plug. A similar seal 42 is provided adjacent to and parallel with end face 40. Instead of O-ring seals, protruding sealing sections may be integrally formed, as by machining, on the plug body itself.

Insert 34 has a threaded section 44, with external threads complementary to the threads in portion 30 of the valve section, and an enlarged head 46 (FIG. 1). The insert may be attached to the upper end of plug 32 by means of a pin 48 inserted in corresponding openings in the head and plug. (It will be understood that insert 34 is hollow, to receive the plug.) Knob 36 fits around head 46 and is secured as by screws 54, only one of which is shown.

Figure 2:
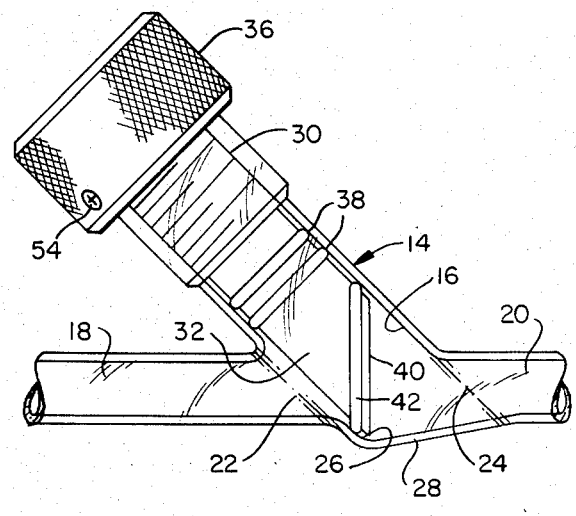
FIG. 2 is an elevational view of the assembled structure shown in closed position.

With the above construction, valve member 12 may be threaded into the valve housing until the position shown in FIG. 2 is reached. In this position, the valve plug isolates the ports one from the other, with ring 42 of the plug forming an elliptical seal around the valve chamber in a plane perpendicular to the axis of the arms extending upwardly from sealing section 26. The pitch of the threads and the position of end face 40 may be such that when the valve member 12 is threaded outwardly by 180°, the plug turns into the open position shown in FIG. 3, where end face 40 is substantially parallel with the common axis of the arms and ports and both of the ports are substantially completely uncovered, with the free end of the plug projecting only a small amount into the path of fluid flow between the ports.

Figure 3:
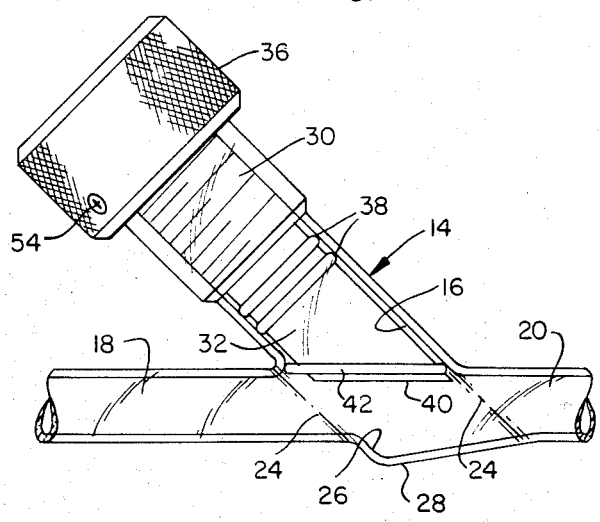
FIG. 3 is an elevational view of the structure similar to FIG. 2 but shown in open position.

The thread pitch and general configuration of the elements may be such that further 360° outward rotation of the plug, from the position shown in FIG. 3, is sufficient entirely to remove the end of the plug from within the fluid flow path.

In the position shown in FIG. 3, and in the further open position noted above, seals 38 prevent fluid from leaking from the valve chamber.

To facilitate operation, the position of the plug shown in FIG. 2 preferably is made to correspond with the termminal point of thread travel. This may be achieved, for example, by attaching insert 34 to plug 32 only after the plug has been inserted into the correct position in the valve housing. Then, insert 34 may be threaded to the end of the thread travel and attached to the plug.

Valve structures as described and illustrated afford favorable characteristics included among the following.

A substantially unobstructed flow path may be provided between the ports with only 180° rotation of the plug from closed position. This facility allows for the introduction of particulate solids such as capsules into a system by means of a rod or tube which may be passed through the valve chamber.

The barrel section of the valve housing being cylindrical beyond the threaded section, dispenses with the need for any special shaping of its distal end, thereby effecting economies in construction.

The structure can, within the confines of a vacuum system, provide a quick opening seal of relatively large bore, permitting faster pumping speeds than are possible with a conventional stopcock of similar external dimensions. In the preferred form, as described, the full bore of the ports is available for flow with 1½ full turns of the plug, from closed position.

The facility for removing the plug completely from the path of fluid flow provides low turbulence characteristics in a quick-opening valve and is useful in alleviating a problem of long-standing. For example, certain rubber latices and suspensions impinging on valve mechanisms in conventional forms of stopcocks may cause turbulence, with rapid particulate deposit and clogging, not only in the valve but also downstream thereof. The present structure tends to alleviate this problem.

The enlarged head of knob 36 serves not only to provide leverage in operating the plug, but also serves to protect the threaded area of the glass housing against impacts.

When using the valve structure in particulate system, it is self-cleaning when port 24 is used as the inlet port. In this arrangement, some particulate may accumulate in the base of the barrel section of the housing, but when the plug is turned, when opening the valve, O-ring seal 42 may serve to wipe the material from the glass into the fluid stream. The stream, moving parallel to the end face of the plug, may scrub residual particles from the PTFE surface. During closing of the valve, any material deposited on the glass from the flowing stream may be wiped back into the base section. In other applications, flow through the valve may be in the opposite direction.

It will be appreciated from the foregoing that valve structures as described are well suited to fulfilling the objects of the invention. While only preferred embodiments of the invention are described herein in detail, the invention is not limited thereby and modifications may be made within the scope of the attached claims.

I claim:

1. A valve structure comprising a valve housing defining a valve chamber with a cylindrical wall, means defining a first port in said cylindrical wall, means defining a second port in said cylindrical wall opposite said first port, whereby a fluid flow path extends between said ports, a cylindrical valve plug mounted in said chamber coaxially with said cylindrical wall for rotation about the axis of said cylindrical wall, means including cooperating threads on the valve chamber and the plug for providing axial movement of the plug in said valve chamber in conjunction with rotational movement of the plug about the axis of said cylindrical wall, said plug having an end portion with an end face inclined to said axis and having sealing means, including an elliptical seal extending peripherally around the plug adjacent to said end face, for isolating one port from the other when the plug is rotated to a closed position at which said end face of said plug is interposed between said ports, and for wiping said cylindrical wall as said plug is rotated, the axial movement of said plug beinng in a direction withdrawing said end face of the plug from between the ports when the plug is rotated from said closed position to an open position and in the opposite direction when the plug is rotated from said open position to said closed position, said plug being substantially withdrawn from between said ports with said end face at one side of said flow path when said plug is in said open position.

2. A structure as defined in claim 1, wherein the axis of said cylindrical wall defines an acute angle with said flow path extending between the ports, the end face of the plug being at a corresponding angle to the axis of said cylindrical wall so that when said plug is in said closed position, the end face is disposed substantially perpendicular to said flow path, and when said plug is rotated to said open position, the end face is disposed in substantial parallelism with said flow path.

3. A structure as defined in claim 1, wherein said threads comprise internal threads in the valve chamber and external threads on the plug.

4. A structure as defined in claim 1, wherein the threads are constructed to provide a point of maximum insertion of the plug into the chamber, said point of maximum insertion corresponding to said closed position.

5. A structure as defined in claim 1, wherein said threads are constructed so that 180° of rotation of said plug is effective to rotate said plug between said open and closed positions.

6. A structure as defined in claim 1, wherein said threads are constructed so that 540° of rotation of the plug from said closed position is effective to fully withdraw the plug from said fluid flow path.

7. A structure as defined in claim 1, wherein said plug comprises a first part carrying said sealing means and a second part carrying said threads of the plug, said second part being constructed to receive said first part and being attached thereto.

8. A structure as defined in claim 7, wherein said plug includes a knob connected to said second part of the plug.

9. A structure as defined in claim 1, including inlet and outlet tubes extending oppositely from the respective ports.

10. A structure as defined in claim 9, wherein said valve housing and said inlet and outlet tubes are formed integrally of glass tubing.

11. A structure as defined in claim 1, wherein said housing is tubular glass and the plug is machinable polymeric material.

12. A structure as defined in claim 1, wherein said valve chamber comprises a barrel open at one end to receive said plug.

13. A structure as defined in claim 12, wherein said plug has an operating knob that covers said open end of said barrel.

14. A structure as defined in claim 12, including additional sealing means surrounding said plug between said end portion of said plug and said open end of said barrel.

* * * * *